United States Patent Office 3,620,186
Patented Nov. 16, 1971

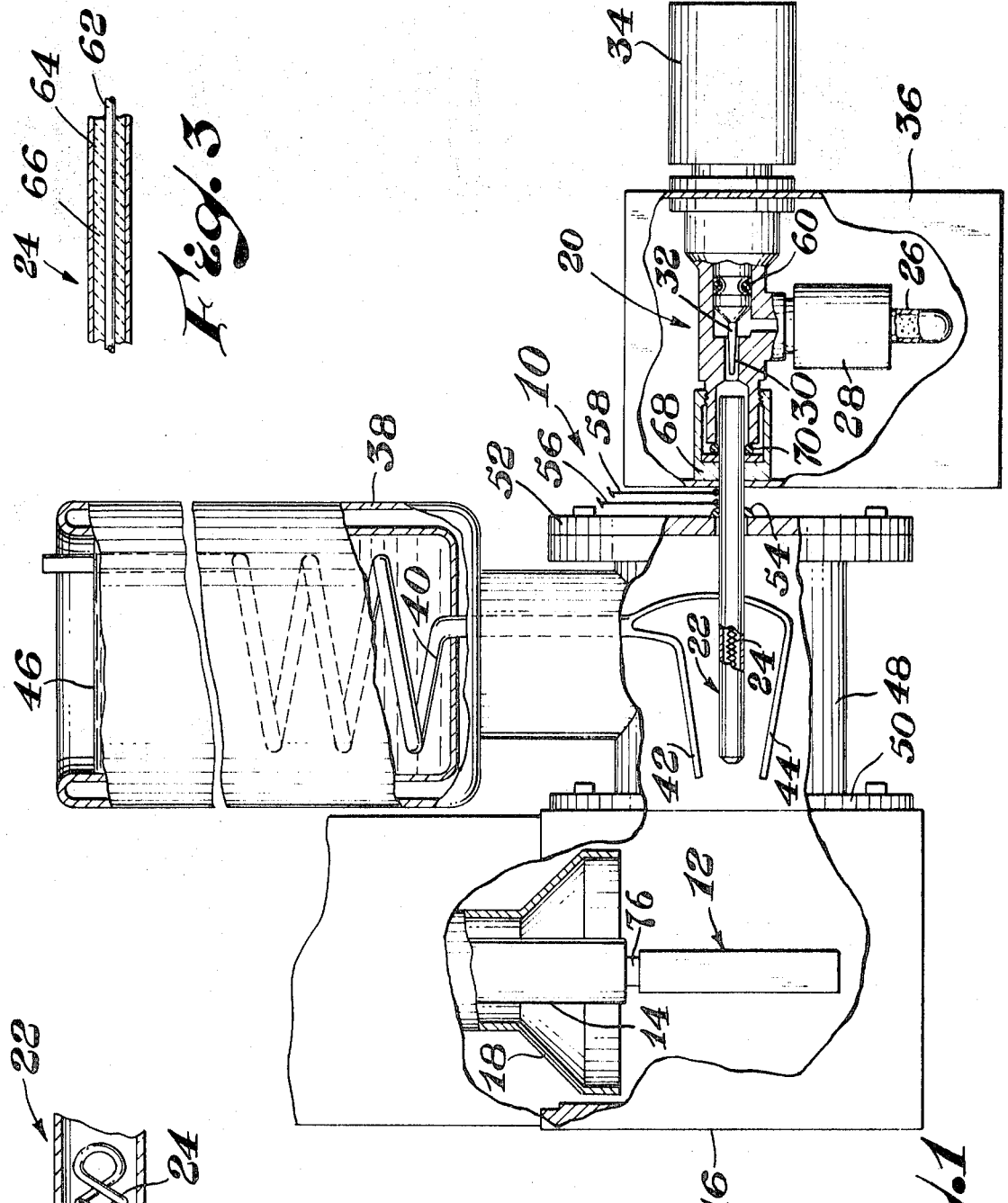

3,620,186
INFRARED SPECTROSCOPY APPARATUS
Stanley T. King, Midland, Mich., assignor to The Dow Chemical Company, Midland, Mich.
Filed Dec. 2, 1969, Ser. No. 881,506
Int. Cl. C23c 11/00
U.S. Cl. 118—48                              4 Claims

ABSTRACT OF THE DISCLOSURE

This invention relates to apparatus for use in isolating monomers of hydrogen-bonded organic compounds, liquids or solids at room temperature in a low temperature inert gas matrix. The apparatus comprises a refrigerated section having an infrared window, a second refrigerated section for pre-cooling the inert matrix gas and for receiving vaporized material to be deposited on the infrared window, the second section having matrix gas nozzles adjacent to a sample inserting nozzle entering the second section from an adjacent sample heating and valving section. The sample inserting nozzle has internal heating means for maintaining the sample material and the nozzle's internal walls above the temperature at which sample material deposits on the inner wall of the nozzle.

BACKGROUND OF THE INVENTION

This invention relates to apparatus for use in infrared spectroscopy and particularly to a matrix isolation device for use in studying hydrogen-bonded, high-boiling organic compounds by infrared spectroscopy. Low temperature matrix isolation techniques have been used by infrared spectroscopists for more than ten years in the study of low-boiling compounds, unstable molecular species and very high-boiling inorganic compounds. However, little information can be found in the literature about the matrix isolation of the strongly hydrogen-bonded solid organic compounds for analytical studies.

It is well-known to spectroscopists that molecules with OH or NH groups are usually intermolecularly bonded in the liquid or solid phases and the O—H or N—H stretching absorption band is broad in the infrared spectrum. It is difficult to interpret this broad band into useful chemical information. On the other hand, the unassociated OH group shows a sharp absorption in the region 3800–3500 cm.$^{-1}$ and the unassociated NH group shows a sharp absorption in the region 3600–3200 cm.$^{-1}$ and the frequency at which this band absorbs enables specific identification of the particular group present in the molecule. Infrared spectra of unassociated species of molecules containing the NH or OH group can be obtained in dilute solution, but the molecule must be soluble in a suitable solvent which does not mask the $\nu_{NH}$ or $\nu_{OH}$ absorption bands or other bands. Moreover, many compounds are not soluble in a suitable solvent, and the spectra of their unassociated species cannot be studied in this manner.

Thermal disassociation of hydrogen-bonding in the gas phase is another way to obtain the infrared spectrum of the monomeric species, but for solid sample with very low vapor pressure, a good vapor spectrum is very difficult to obtain. In addition, the overlapping of the broad bands in gas phase spectrum makes it difficult to distinguish them. The spectrum of the monomeric species isolated in low temperature matrix can avoid all the problems discussed above.

Generally, the unassociated species, which can be obtained either by thermal dissociation or by dilution in gas phase, are frozen in a large amount of inert gas matrix on a cold window surface (at 6 or 20° K.) is impractical for a solid sample with negligible vapor pressure at room temperature. Therefore, thermal dissociation has to be used in this case. Usually the hot, unassociated sample in the vapor phase is deposited on the cold window separately with the pre-cooled matrix gas through two different nozzles. Otherwise, the deposition of the pre-mixed hot sample with a large amount of hot matrix gas will cause an instantaneous temperature increase on the cold window surface and poor results of the isolation may be obtained. Knudsen cell has been used by many investigators to study the unassociated species of the very high-boiling inorganic compounds in a low temperature matrix. However, it usually takes a very long deposition time, and it is very inconvenient for semiroutine analysis on organic compounds. Accordingly, a principal object of this invention is to provide an improved device for use in isolating monomers of hydrogen-bonded organic compounds, liquids or solids at room temperature in a low temperature inert gas matrix.

Another object of this invention is to provide an improved, faster operating and easier to use device for use in isolating monomers of hydrogen-bonded organic compounds, liquids or solids at room temperature in a low temperature inert gas matrix.

In accordance with this invention there is provided a matrix isolation apparatus comprising a refrigerated section which includes a rotatable so called infrared window on which the material to be analyzed is deposited, a section for pre-cooling the matrix gas and having nozzles located on each side of a sample nozzle which is inserted into that section from an adjacent sample valving and heating section. The sample nozzle has an internal heating coil which is used to prevent cooling of the sample before it leaves the nozzle, preventing settling of the sample material on the nozzle wall. Such a heating coil reduces the need for cleaning the sample nozzle, results in more sample material reaching the infrared window and reduces the heat input to the refrigerated part of the apparatus. The invention, as well as additional objects and advantages thereof, will best be understood when the following detailed description is read in connection with the accompanying drawing, in which:

FIG. 1 is a diagrammatical view, partly broken away and in section, of apparatus in accordance with the invention, FIG. 2 is a fragmentary enlarged view of the heating coil in the sample nozzle, and FIG. 3 is a fragmentary view showing the form of heating element used in the heating coil.

Referring to the drawing, and particularly to FIG. 1, there is shown matrix isolation apparatus, indicated generally by the numeral 10. The apparatus 10 comprises a first refrigerated compartment 16 having dispersed therein a heat-exchanger 14 containing liquid hydrogen, liquid helium, or both. A so-called infrared window 12, composed of a crystal of sodium chloride, potassium bromide or cesium iodide, for example, in a metal (copper, for example) frame is mechanically and thermally coupled to the lower end part of the heat exchanger 14, A radiation shielding structure 18 surrounds the heat exchanger.

A second section, comprising a compartment 48 having a vacuum container such as a Dewar container 38 coupled to it, is coupled to the compartment 16 near the lower end thereof by means of a mounting flange 50.

The container 38 contains liquid nitrogen and a coil 40 through which the matrix gas (argon, for example) pre-cooled by the liquid nitrogen, is to be introduced to the chamber 48 through nozzles 42, 44 which are coupled to the lower part of the coil 40.

A sample input nozzle, indicated generally by the numeral 22, is rigidly coupled, as by silver soldering at 54, to a flange plate 52 which is coupled to the compartment 48 on the side thereof which is opposite the flange 50 and facing the window 12 as shown in FIG. 1.

The nozzle 22 is coupled by means of coupling element 68 and O ring 70 to the output end of sample valving apparatus 20 which includes a sample container 26 coupled to the body of the apparatus 20 by a sleeve coupling element 28. A micrometer handle element 34 having an O ring seal 60 on its inwardly extending part, has a needle-like valve element 32 which is retractable in and out of the valve seat channel 30, controls the flow from the sample container 26 to the sample nozzle 22. The apparatus 20 except for the nozzle 22 and handle 34 is disposed within a heated box 36 which may be heated in any suitable manner as is well known to those skilled in the art.

A heating coil 24 is disposed within the sample nozzle 22, extending from the output end at least to a point within the heated box 36. The coil 24 is energized through coil leads 56, 58 which extend through and are sealed to the wall of the nozzle 22 between the flange 52 and the wall of the heated box 36.

Referring to FIG. 2, it may be seen that the coil 24 fits loosely within the nozzle 22 and may be, if desired, wound back upon itself. The "wire" of coil 24, as shown in FIG. 3, is a fine wire 62, surrounded by insulation 64 and enclosed in a thin walled copper outer tube. Thus, the outer tube readily transmits heat to the inner wall of the nozzle 22 but the electrical conductor 62 is insulated from the nozzle wall.

In operation, the sample material is inserted in the container 26 and the box 36 is heated to, for example, about 100 degrees centigrade to vaporize the sample. The flow rate of the vaporized sample is controlled by the valve element 32.

The heating coil in the nozzle 22 is maintained at a higher temperature (200 degrees centigrade, for example) than the temperature in the heating box 36 so as to ensure disassociation of the hydrogen bond molecules and also to prevent any deposition of the sample on the nozzle 22. It is very important to keep the sampling device free from sample deposition for routine analysis use because otherwise the impurity from the previous sample would obscure the spectrum of a new sample.

The temperature of the window 12 is reduced by the heat exchanger to a temperature of 20 degrees Kelvin operating with liquid hydrogen or to 6 degrees Kelvin operating with hydrogen and helium gases.

The sample vapor and matrix gas from the nozzles 42, 44 are directed to the window 12 where the sample material is frozen in the matrix gas. The window 12 is then rotated 90 degrees so the window may be aligned with respect to the infrared beam in the spectrometer (not shown) and the spectrum recorded.

After the deposition is finished and the spectrum is recorded, the metering valve 32 is shut, the heater in the heating box 36 is turned off and a door on the heating box 36 is opened. The sample container 26 will be cooled down faster than that of the valve 20 because of the difference in heat capacity between the glass and the stainless steel valve body. All the excess sample is recondensed in the sample container 26 and can be removed from the system by opening the coupling 28. Therefore, one can exchange sample without breaking the vacuum in the vacuum compartments of the apparatus. A heater 76 on the tip of the heat exchanger can be used to warm the cold window in a short time without upsetting the refrigerant therein. Thus, the sample on the cold window 12 can be evaporated with the matrix gas. Now the whole system is ready to make another run for the new sample. The small amount of air trapped in the glass sample container 26 will have negligible effect on the matrix isolation. This rapid exchange of the samples is necessary for routine analysis.

Excellent results were obtained with the apparatus when pyrazole was used as the sample material with the sample container kept at room temperature and the sample nozzle temperature at 90 degrees centigrade. The sample vapor was isolated in an argon matrix at 20 degrees Kelvin. About .012 mole of argon gas was deposited in one hour.

In the infrared spectral analysis single sharp absorption at 3495 cm.$^{-1}$ of the monomeric N—H stretching indicated good isolation of monomeric species. Also four sharp lines in the region 1300–1500 cm.$^{-1}$ can be undoubtedly recognized and can be assigned as four ring vibrations. With the help of this sharp spectrum of monomeric species, the vibrational analysis can be achieved more easily.

Another material analyzed successfully with this apparatus is imidazole. Imidazole is a strongly hydrogen-bonded compound (M.P. 90° C., B.P. 256° C.) which is almost insoluble in $CCl_4$. In polar solvents imidazole only partially dissociates into monomeric form. In the imidazole analysis the sample in the container 26 was heated to 100° C. and the sample nozzle was kept at 200° C. Total deposition time was one hour. The sharp absorption lines in the spectrum can be very easily recognized.

The actual heater coil used was No. 28 AWG semi-rigid cable using a constantan inner conductor, glass braid insulation and a seamless outer conductor. The nozzle was about 4 centimeters in length and made of ⅛ inch O.D. stainless steel tubing.

Other suitable apparatus may be substituted for the heat exchange 14 than the Cryo-Tip model AC3L–110 made by Air Products and Chemicals, Inc., the unit was used in making the above described tests.

What is claimed is:
1. In an infrared spectral analysis apparatus comprising:
(1) a deposition chamber;
(2) a rotatable infrared window disposed therein and adapted to receive a coating of a sample to be analyzed;
(3) a heat exchanger having a highly evaporative cold liquid thermally coupled to said infrared window;
(4) nozzle means extending through a wall of said chamber whereby to dispense said sample in vapor form and having a heating element therein;
(5) a source of said sample material and means commuicating said source with said nozzle;
(6) second nozzle means disposed in said chamber;
(7) means thermally coupled with a refrigerant heat exchanger for delivering pre-cooled matrix gas to said second nozzle; and
(8) said nozzles for dispensing vapor sample and matrix gas being operatively associated with each other and with said infrared window whereby to deposit said sample, frozen in said matrix gas, on the window.
2. Apparatus as in claim 1 wherein the heating element compirses an electrical resistance.
3. Apparatus as in claim 1 wherein the second nozzle means comprises a plurality of nozzles disposed about the heated nozzle.
4. Apparatus as in claim 1 wherein said means communicating includes a micrometer adjusting type metering valve.

References Cited
UNITED STATES PATENTS

| | | | |
|---|---|---|---|
| 2,847,319 | 8/1958 | Marvin | 118—49 X |
| 3,055,775 | 9/1962 | Crittenden, Jr. et al. | 118—49 X |
| 3,462,609 | 8/1969 | Beattie | 356—37 UX |
| 3,526,460 | 9/1970 | Webb | 118—9 X |

MORRIS KAPLAN, Primary Examiner

U.S. Cl. X.R.

118—69; 250—83.3 H; 356—38